July 28, 1970  G. PODSCHADLY ET AL  3,521,965
LIQUID SAMPLE CELL FOR POLARIMETERS
Filed Dec. 20, 1965  2 Sheets-Sheet 1

GERHARD PODSCHADLY
PETER MAYER
INVENTORS

July 28, 1970   G. PODSCHADLY ET AL   3,521,965
LIQUID SAMPLE CELL FOR POLARIMETERS
Filed Dec. 20, 1965   2 Sheets-Sheet 2

GERHARD PODSCHADLY
PETER MAYER
INVENTORS

BY

United States Patent Office 3,521,965
Patented July 28, 1970

3,521,965
LIQUID SAMPLE CELL FOR POLARIMETERS
Gerhard Podschadly, Uberlingen (Bodensee), and Peter
Mayer, Mullheim, Baden, Germany, assignors to Bo-
denseewerk Perkin-Elmer & Co. G.m.b.H., Uberlingen
(Bodensee), Germany
Filed Dec. 20, 1965, Ser. No. 514,946
Claims priority, application Germany, Dec. 28, 1964,
B 79,915
Int. Cl. G01n 21/40, 1/10
U.S. Cl. 356—246  4 Claims

ABSTRACT OF THE DISCLOSURE

A sample cell for a polarimeter includes a thick strong plate having a central aperture, partially defining the sample-holding compartment. A pair of transparent windows are attached at the opposite surfaces of the thick plate in such a manner as to avoid developing internal stresses in the windows. For moderate length sample paths (i.e., about 1 centimeter) the windows are attached directly to the external surfaces of the thick plate by means of a low melting point glass. For shorter sample path lengths (e.g., from 1 to 5 mm.) washer-like intermediate rings are attached to the external surfaces of the somewhat thinner main plate; and smaller diameter windows are attached to the inside confronting surfaces of the rings (i.e., inside the plate aperture). In both embodiments a thermostating annular water jacket surrounds the periphery of the sample compartment.

The present invention relates to a liquid sample cell for polarimeters wherein cell windows are fused onto both sides of a hollow cell body open at both sides.

In sample cells for polarimeters of high measuring sensitivity there exists the problem of fastening the entrance and exit windows which are penetrated by the measuring beam, so as to be free of stress, for stresses in the windows may cause a double refraction whereby the measured values sample being made by the polarimeter are falsified. Hitherto, it was believed that this falsification caused by double refraction due to stresses in the windows could be compensated by measuring first with the empty cell and secondly with the cell filled with sample, but this is not actually the case for two reasons:

If an optically active sample substance is within the sample cell, polarized light of different direction of oscillation will impinge upon the exit window of the sample cell than with an empty cell. The manner in which the light will be influenced by the exit window if the latter becomes double-refracting due to stress depends on this direction of oscillation (and therefore on the unknown polarization properties of the sample). Thus, this influence cannot be compensated. The only effect that could be compensated would be the mean rotation of the entrance window. However, this rotation alone cannot be determined by polarization measurement of the overall empty cell (i.e., through both windows).

Further, the rotation of the polarization plane, caused by double refraction due to stresses in the windows, is different at different points. Thus, in the state of balance (i.e., null) of the polarimeter there will be a mean intensification of the measured beam giving rise to an increase in the measured noise. The double refraction due to window stress should be taken into consideration especially when measuring rotational dispersion and circular dichroism, since the effect of the double refraction due to stress is wavelength-dependent, and when measuring very weak effects such as circular dichroism is, of necessity, quite disturbing.

Typical present sample cells for polarimetric measurements comprise a cylindrical cell pipe with surface-ground end faces. The open ends are closed off by windows which are supported against the end faces of the cell pipe, and are retained by a screw connection in the manner of a cap nut. The screw connection, however, causes stresses in the windows. Additional stresses may be caused by thermostaticizing of the overall sample cell. Such cells do not satisfy the greater freedom from affecting the measurements required in extreme precision measurements. Specifically, this problem exists with sample cells having a short sample path wherein on account of the short light path in the optically active medium the amount of the rotation of the polarization plane of the light is relatively small. That sample cells should be reasonably free of stress for mechanical stability of the cell is already a known requirement. Cells with internal stresses are in danger of breaking during transport and under temperature stresses may break even if only slight additional stresses of some kind are imposed. It is known to investigate the freedom of stress by using polarized light. This degree of freedom of mechanical stress should, however, not be confused with the much stricter requirements for sample cells for polarimeters of high measuring sensitivity. These latter requirements are higher by two orders of magnitude than those made for mechanical reasons.

Sample cells are known wherein plane windows are fused onto both sides of a hollow cylindrical cell body open on both sides. However, in these sample cells also thermal and mechanical stresses in the cell body may exert an effect on the windows. Therefore, such cells are only suitable with relatively greater layer thicknesses.

It is the object of the present invention to provide a liquid sample cell for polarimeters wherein within the stringent requirement as to accuracy of highly sensitive polarimeters (for instance, for measuring the rotational dispersion or circular dichroism of the sample) there will be no appreciable double refraction due to stress on the windows, or the like.

According to the invention this object is attained by providing that the hollow cell body is a strong plate 10, 32 with an opening 12, 34 provided centrally therein, constituting the sample holding compartment, and that the windows 14, 16; 40, 42 are connected with the plate 10, 32 by means of a thin film of a low-melting point glass as by melting-on (i.e., fusion).

With such an arrangement the thick plate absorbs essentially all of the external mechanical stresses. Stresses already present in the plate cannot exert any action on the windows, as the windows are cemented on subsequently. A further factor counteracting the development of stresses in the cell windows is the substantially symmetrical design of the cell, since the cell compartment is provided by a central opening in the plate and the windows are accordingly centrally fused onto the plate. Thus, there exists no asymmetry and therefore no preferential direction. In the fusing or melting-on process itself (as distinguished from a screw connection) no stresses are developed in the windows, or any that may occur may be compensated during cooling.

In a second modification of the invention, plate 32 and windows 40, 42 may have interposed therebetween a thin intermediate ring each 36, 38. This will additionally prevent stresses from passing from the plate to the window. In addition, sample cells having a particularly small sample layer thickness may then be made since the external diameter of the windows 40, 42 is smaller than the interior diameter of the sample cell compartment 34, and the windows 40, 42 are fused onto the confronting internal sides of the intermediate rings 36, 38. The windows protrude inwardly into the opening constituting the cell compartment so that the layer thickness (plate thickness less twice the overall window thickness) may be made extremely small even with a relatively thick plate.

The invention has thus made possible the production of sample cells which have extreme freedom of stress which suit the stringent requirements of high-precision polarimeters, and wherein no mechanical stresses are detectable in the optical beam path by conventional polarimetric stress testing means.

Two embodiments of the invention are presented in the drawings and described as follows.

Figure 4:
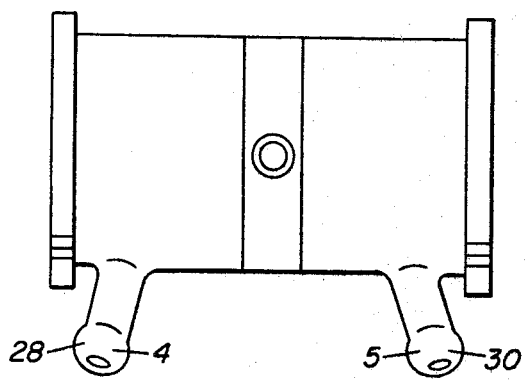

FIG. 4 a side view thereof.

Figure 1:
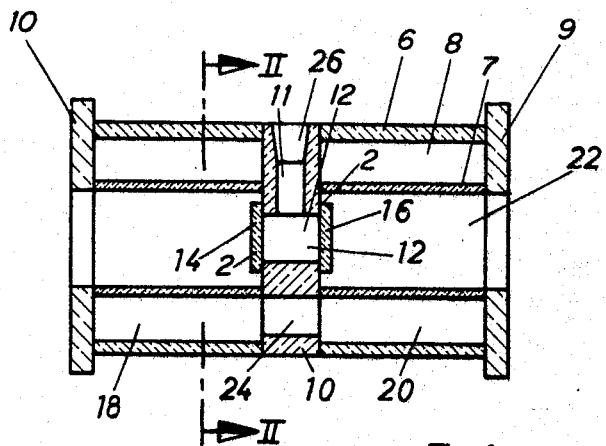
FIG. 1 is a longitudinal vertical section along line I—I of FIG. 3 through a sample cell in accordance with the invention.
Figure 3:
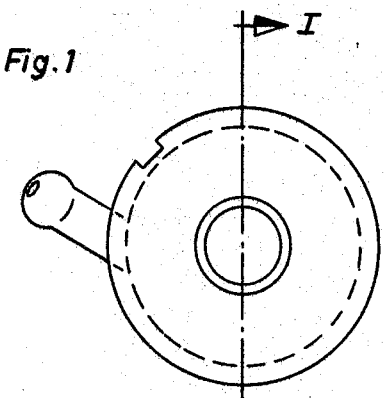
FIG. 3 is an end view of the sample cell.
Figure 2:
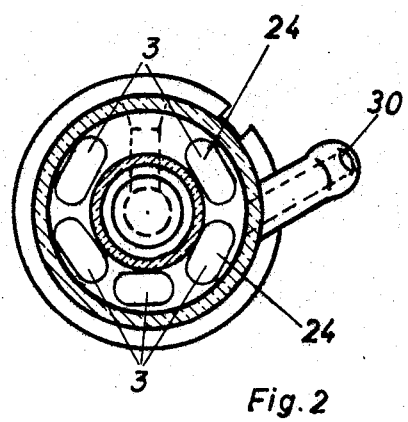
FIG. 2 is a section along line II—II of FIG. 1.
Figure 5:
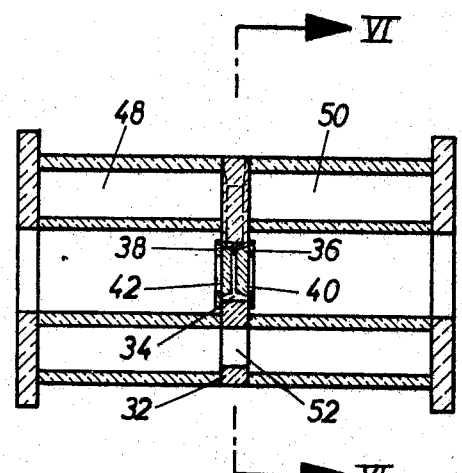
Figure 6:
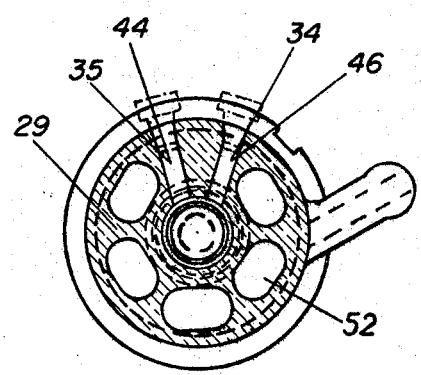

FIG. 5 is a longitudinal section of an alternate sample cell according to the invention, and FIG. 6 is a section along line VI—VI of FIG. 5.

In FIGS. 1 to 4 there is illustrated a first embodiment of a sample cell in accordance with the invention, having a sample layer thickness (i.e., light path length through the sample) of 1 cm. and a volume of 0.5 cm.³. The sample cell is made of optical glass or quartz and comprises a plate 10 the thickness (i.e., horizontal dimension in FIGS. 1 and 4) of which corresponds substantially to the desired sample layer thickness. Plate 10 is of circular shape (i.e., a thin cylinder) and is formed with a central opening 12 constituting the (sample holding) cell compartment. Opening 12 is closed off on both sides by windows 14, 16 being molten (i.e., fused upon) on the plate 10 by means of a thin film of a low-melting-point glass.

In axial direction contiguous to plate 10 there are provided jacket type chambers 18, 20 for thermostat water, entirely outside of a central channel 22 for passage of the optical beam path therethrough. These chambers are formed by spaced, concentric, cylindrical walls 6 and 7 having an annular space 8 therebetween for the water, and closed at each end by an apertured plate 9 and 9'. Chambers 18 and 20 communicate with each other through openings 24 of plate 10. Openings 24 are arranged substantially symmetrically with respect to the cell compartment 12 in plate 10. Thereby, any particular preferential direction or dissymmetry is avoided which might give rise to stresses in windows 14 and 16. A radial channel 26 releasably closed by a Teflon plug, permits introduction of the sample into compartment 12. The thermostat water is supplied and discharged, respectively, through connection pieces 28, 30.

The second embodiment according to FIGS. 5 and 6 is a sample cell with short light path for sample layer thicknesses of from 1 to 5 mm. Therein, a circular plate 32 (somewhat thinner than the corresponding plate 10 of FIGS. 1–4) has a central opening 34 constituting the cell compartment, and the plate 32 has fused thereto thin intermediate rings 36, 38. The confronting internal sides of intermediate rings 36 and 38 have fused thereon windows 40 and 42, respectively. Between the windows, the diameter of which is smaller than opening 34 and have their total thickness protruding into opening 34 from both sides, the layer of sample liquid to be measured is provided. The cell compartment 34 is accessible in this embodiment through two radial channels 44, 46.

Contiguous to plate 32, axially extending jacket type chambers 48, 50 for thermostat water are provided with each other through openings 52 of plate 32, all in a similar manner to the corresponding structure of the (FIGS. 1–4) first embodiment.

The invention is claimed as follows:

1. A liquid sample cell for polarimeters comprising:
a generally disc-shaped, solid strong plate (10, 32) having a central opening (12, 34), which constitutes the sample compartment;
a pair of optically transparent windows (14, 16; 40, 42) sealingly attached to the exterior surfaces of said solid strong plate, by means comprising a thin film of a low melting point glass;
said solid strong plate having a thickness, as measured perpendicularly between said exterior surfaces, substantially greater than the thickness of said windows;
the internal diameter of said central opening as defined by the inner wall of said plate being only a minor fraction of the total outer diameter of said plate, as measured in a direction parallel to said exterior surfaces thereof;
said solid strong plate and said optically transparent windows each being composed of substantially the same common material, so as to have substantially identical thermal expansion characteristics;
said thin film being of a glass having a melting point substantially lower than said substantially common material composing said plate and said windows;
whereby said low melting point glass may adhere said windows to said plate by fusion at a temperature higher than the melting point of said low melting point glass but below the melting point of the substantially common material of both said windows and said plate, so that no stresses are produced by the heating and cooling during manufacture in said optically transparent windows, nor are such stresses produced by thermal changes during subsequent use, thereby avoiding any substantial strains which may cause undesirable polarization effects by said windows.

2. The liquid sample cell defined in claim 1, in which:
a pair of centrally apertured, thin intermediate rings (36, 38) are sealingly attached by fusion to the exterior surfaces of said solid strong plate (32); and
each of said windows (40, 42) is sealingly attached by a layer of low melting point glass to a surface of a different one of said thin intermediate rings;
whereby said intermediate ring assists in relieving any stresses that might otherwise be caused in said windows.

3. The liquid sample cell defined in claim 2, in which:
said windows (40, 42) have an external diameter less than the internal diameter of said central opening in said plate; and
said windows are sealingly attached to the internal confronting surfaces of said intermediate rings, so as to lie generally inside said central opening in said plate;
whereby the effective sample path thickness of said cell is the thickness of said solid strong plate, diminished by the combined thickness of both of said windows.

4. The liquid sample cell defined in claim 1, in which:
a pair of generally tubular annular chambers (18, 20; 48, 50) is symmetrically positioned about each side of said solid strong plate;
said annular chambers being adapted to hold a thermostating fluid, but including a central channel (22) for unimpeded passage of the radiation beam passing through said sample cell windows;

said solid strong plate comprising a plurality of passages (24) circumferentially beyond and substantially symmetrically arranged about its said central opening (12), so as to allow free communication of said thermostating fluid between said pair of annular chambers;

whereby said sample cell is symmetrically thermostated so as to avoid any stresses caused by local temperature variations.

References Cited

UNITED STATES PATENTS

| | | | |
|---|---|---|---|
| 1,906,345 | 5/1933 | Waller | 356—246 X |
| 2,027,130 | 1/1936 | Towne | 356—246 |
| 2,819,402 | 1/1958 | Watson et al. | |
| 2,043,816 | 6/1936 | Story. | |
| 3,183,361 | 5/1965 | Bronson et al. | 250—239 |
| 3,379,093 | 4/1968 | Ard. | |

FOREIGN PATENTS 722,967   2/1955   Great Britain.

OTHER REFERENCES

Arechs et al.: "He-Ne Optical Masers: Construction and measurements," Alta Frequenza, XXXI (II), November 1962, pp. 718–21.

"Optical Absorption Cells," Bulletin #65 of the Optical Cell Co. Inc., Brentwood, Md., December 1964, 2 pp. (page 7 and price sheet).

"A Jacketed Cell for the Bendix NPL Polarimeter," L. K. Dalton, J. Sci. Instrum., 1965, vol. 32, pp. 353–4.

"Optical Cell for Pressurized Solids and Liquids at Cryogenic Temperatures," Smith, B. L., Rev. Sci. Instrum., vol. 34, #1, January 1963., pp. 19–21.

RONALD L. WIBERT, Primary Examiner

R. J. WEBSTER, Assistant Examiner

U.S. Cl. X.R.

356—244, 114, 115